INVENTORS
Matthew Parker and
Geoffrey H. Lelelier
By
Watson, Cole, Grindle & Watson
ATTORNEYS INVENTORS
Matthew Parker and
Geoffrey G. Webster
By
Watson, Cole, Grindle & Watson
ATTORNEYS Feb. 21, 1967 M. PARKER ET AL 3,304,690

WRAPPING MACHINES

Filed March 11, 1965 15 Sheets-Sheet 3

INVENTORS
Matthew Parker and
Geoffrey S. Lebeter
By
Watson, Cole, Grindle & Watson
ATTORNEYS INVENTORS
Matthew Parker and
Geoffrey S. Lebeter By
Watson, Cole, Grindle & Watson
ATTORNEYS Feb. 21, 1967 M. PARKER ET AL 3,304,690

WRAPPING MACHINES

Filed March 11, 1965 15 Sheets-Sheet 5

INVENTORS

Matthew Parker and

Geoffrey G. Lobster

By

Watson, Cole, Grindle & Watson

ATTORNEYS

Feb. 21, 1967 M. PARKER ET AL 3,304,690

WRAPPING MACHINES

Filed March 11, 1965 15 Sheets-Sheet 6

INVENTORS
Matthew Parker and
By Geoffrey J. Lebeter
Watson, Cole, Grindle & Watson
ATTORNEYS Feb. 21, 1967 M. PARKER ET AL 3,304,690

WRAPPING MACHINES

Filed March 11, 1965 15 Sheets-Sheet 7

INVENTORS

Matthew Parker and Geoffrey H. Lebeter

By Watson, Cole, Grindle & Watson

ATTORNEYS

INVENTORS
Matthew Parker and
Geoffrey G. Lebeter
By
Watson, Cole, Grindle & Watson
ATTORNEYS INVENTORS
Matthew Parker and
Geoffrey S. Lebeter
By
Watson, Cole, Grindle & Watson
ATTORNEYS INVENTORS
Matthew Parker &
Geoffrey J. Lebeter
By
Watson, Cole, Grindle & Watson
Attorneys Feb. 21, 1967 M. PARKER ET AL 3,304,690

WRAPPING MACHINES

Filed March 11, 1965 15 Sheets-Sheet 11

INVENTORS
Matthew Parker and
Geoffrey J. Lebeter
BY Watson, Cole, Grindle & Watson
ATTORNEYS INVENTORS
Matthew Parker and
Geoffrey G. Lebeter
BY Watson, Cole, Grindle & Watson
ATTORNEYS INVENTORS
Matthew Parker and
Geoffrey G. Lebeter
By
Watson, Cole, Grindle & Watson
ATTORNEYS INVENTORS
Matthew Parker & Geoffrey Gordon Lebeter
By Watson, Cole, Grindle & Watson
ATTORNEYS INVENTORS
Matthew Parker &
Geoffrey S. Leketer
By
Watson, Cole, Grindle, & Watson
ATTORNEYS United States Patent Office 3,304,690

Patented Feb. 21, 1967

3,304,690
WRAPPING MACHINES

Matthew Parker and Geoffrey Gordon Lebeter, Leeds, England, assignors to The Forgrove Machinery Company Limited, Leeds, England, a company of Great Britain Filed Mar. 11, 1965, Ser. No. 438,961
Claims priority, application Great Britain, Mar. 13, 1964, 10,749/64
11 Claims. (Cl. 53—122)

This invention relates to a wrapping machine which is primarily intended for wrapping margarine, butter and like plastic substances which will hereinafter, for brevity, be termed a margarine wrapping machine.

The invention provides a wrapping machine, which includes a plurality of wrapping units each of which is effective completely to wrap an article in a wrapper, means for moving the wrapping units continuously in a predetermined path in relation to an assembly of fixed cams which impart operating movement to the wrapping units, an article feeding mechanism arranged to present articles in succession to the wrapping units as they reach a predetermined point in their path of travel, and a wrapper feed mechanism for presenting wrappers to the wrapping units at the same predetermined point, the wrapping units delivering the wrapped articles at a common discharge point.

The invention also provides a margarine wrapping machine which includes a plurality of die chambers, a wrapping unit associated with each die chamber, each wrapping unit being effective completely to wrap an article in a wrapper, means for moving the die chambers and the wrapping units continuously in a predetermined path around an assembly of fixed cams, means controlled by the fixed cams for actuating the wrapping units and also die plungers in the die chambers, the die chambers moving in succession past an extrusion box which fills them in succession with margarine and the die plungers operating in succession to discharge blocks of margarine to the wrapping units, means for presenting wrappers in succession to the wrapping units as the blocks of margarine are fed into them from the die chambers, and a single discharge mechanism for the discharge of the wrapped blocks of margarine.

Such a machine provides a considerably higher output than would be suggested by the basic speed of the machine because it is possible to accommodate considerably more sequentially operating wrapping units than is commercially feasible in the case of the so-called Duplex type of wrapping machine in which a plurality of wrapping units are operated in unison. A further advantage of the machine is that it requires only a single infeed mechanism for the margarine, a single wrapper feed and a single discharge mechanism.

Preferably the machine includes a continuously travelling gripper assembly arranged to pick up wrappers in succession and traverse them in a path intersecting the path of travel of the die chambers, the wrappers being transferred in succession to the wrapping units at the point of intersection of the two paths.

Preferably the die chambers and a plurality of pairs of grippers travel in circular paths, the die chambers moving in an inner path of smaller radius which touches the outer path traversed by the pairs of grippers. We find that this arrangement ensures sufficient time for accurate transference of the wrappers, upon release of the grippers, to the blocks of margarine as they are introduced into the wrapping units.

A feature of the invention is that the blocks of margarine are slid off the die plungers in a radial direction by jaws in each wrapping unit. This ensures that there will be no change in angular velocity of either the die plunger or the jaws during said slide off and permits of rotation of the die chambers and jaws around the fixed cams at the same constant angular velocity.

A further feature of the invention is that all folding of the wrapper around a block of margarine is effected while the block is in a radial or vertical track or channel of the wrapping unit, no movement in the direction of rotation being required.

Preferably the die chambers travel in a horizontal path and the wrapped blocks of margarine are discharged from the wrapping units by a system of belts including a belt which dislodges the blocks from an elevator in the wrapping unit in case this should tend to stick.

A margarine moulding and wrapping machine according to the invention will now be described in detail, by way of example, with reference to the accompanying drawings, in which.

Figures 1, 1A:
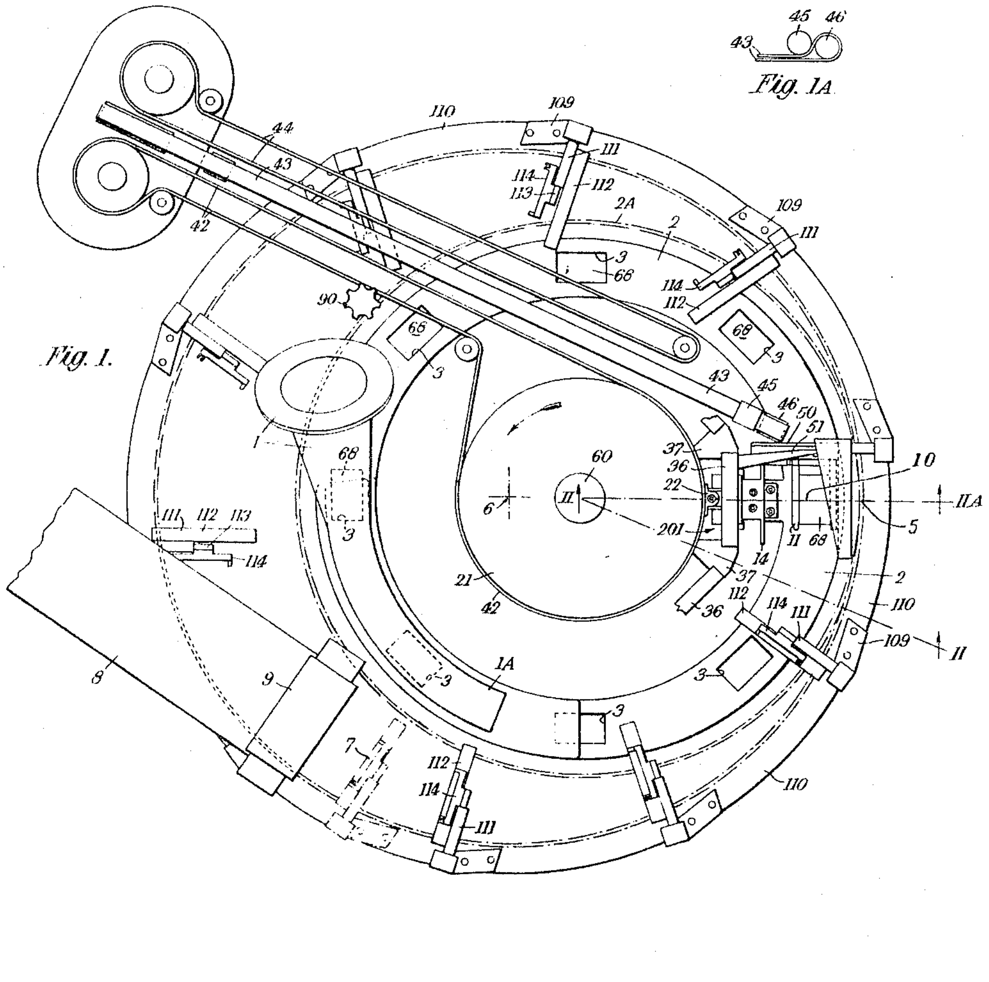
FIG. 1 is a diagrammatic plan view of the machine, with certain parts removed.
FIG. 1A is a scrap-view showing certain parts in FIG. 1.
Figure 2:
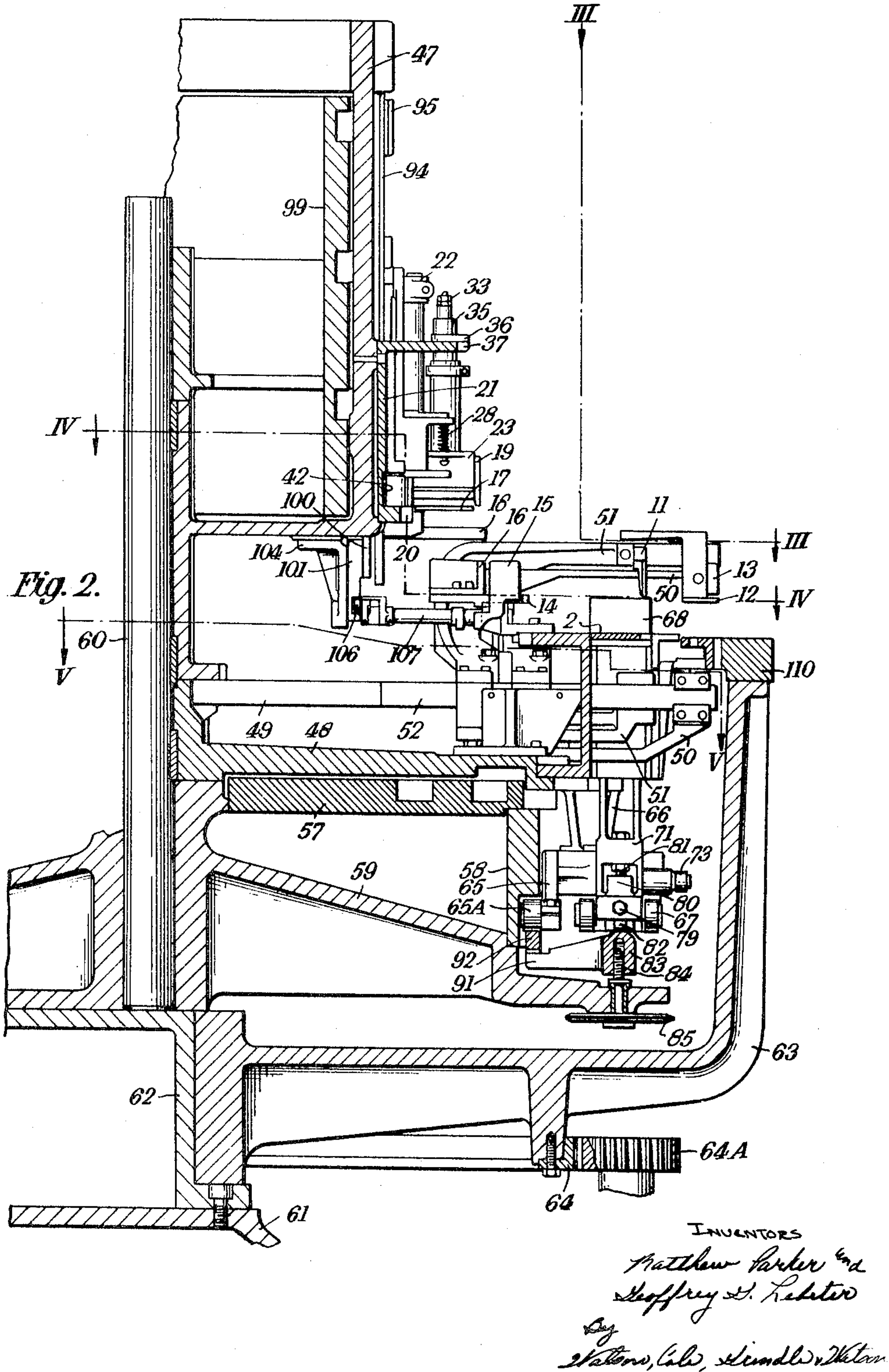
Figure 3:
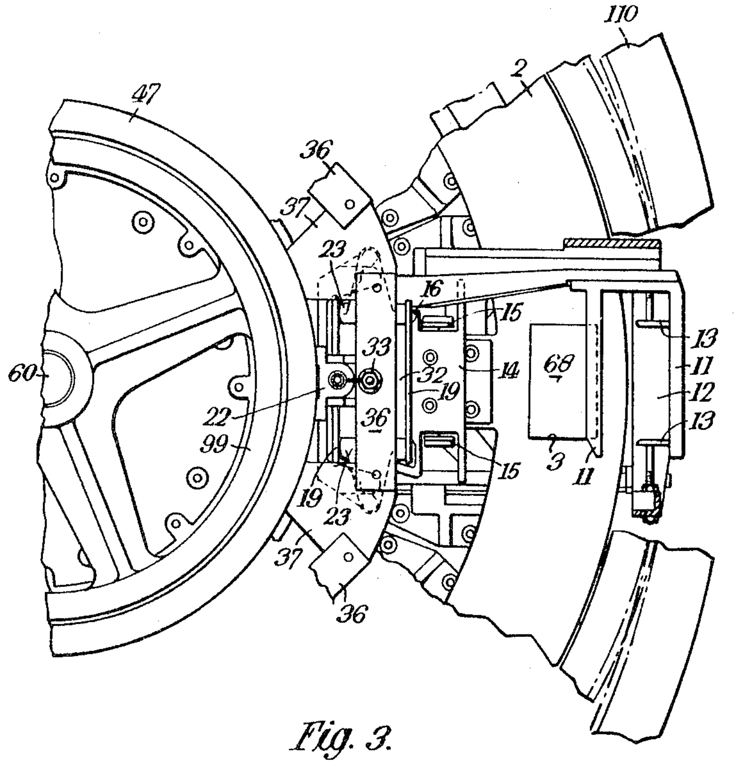
Figures 4, 5, 5A:
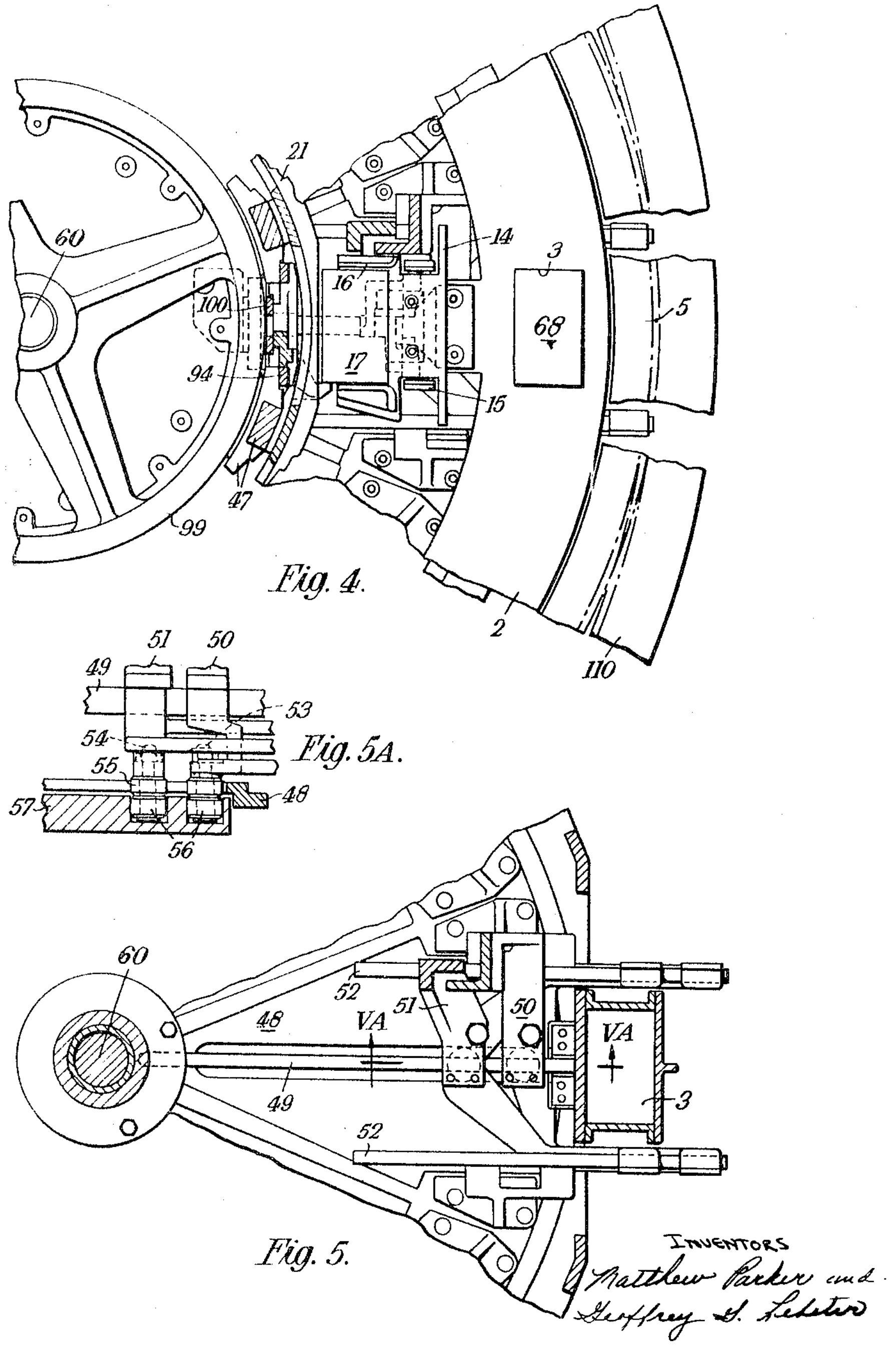
Figure 6:
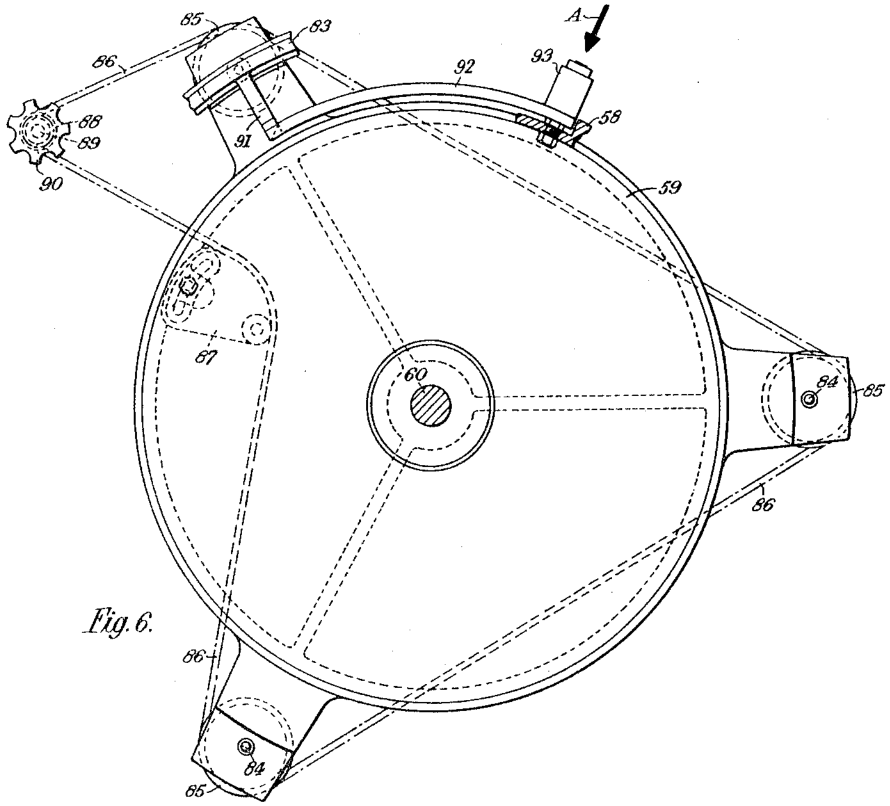
Figure 6A:
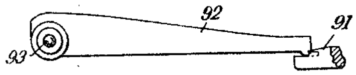
Figure 7:
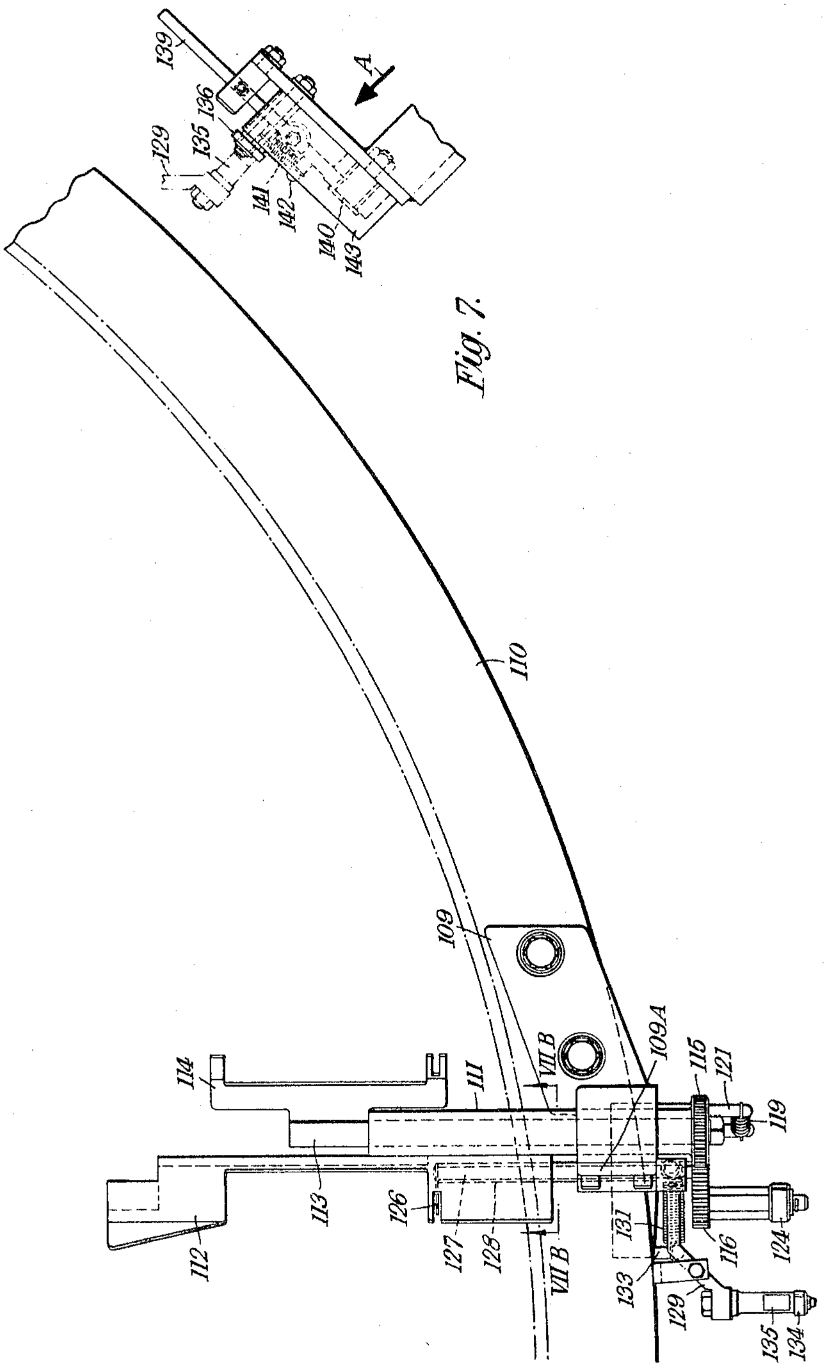
Figures 7A, 7B, 7C:
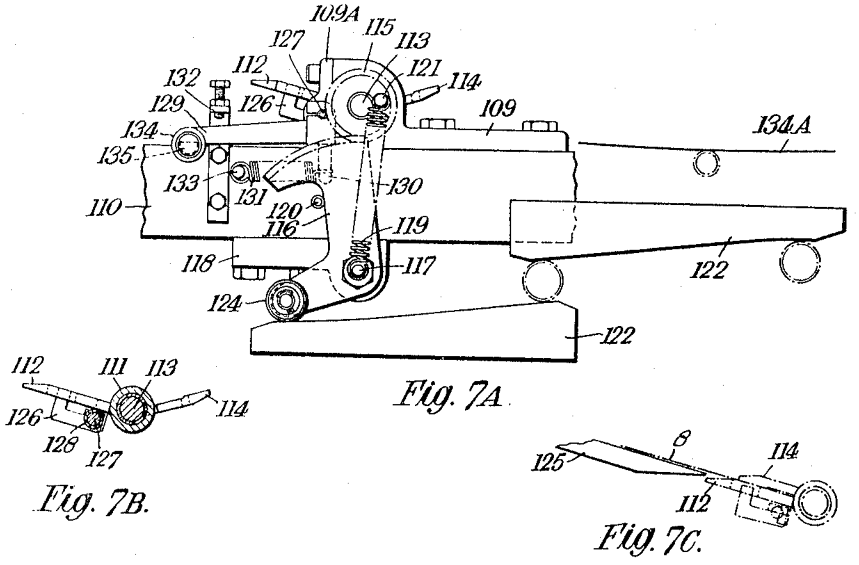
Figure 7E:
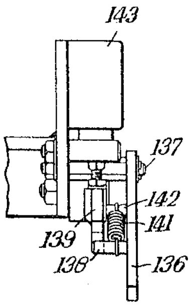
Figure 7D:
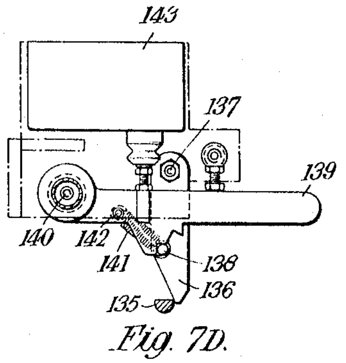
Figures 8, 8A:
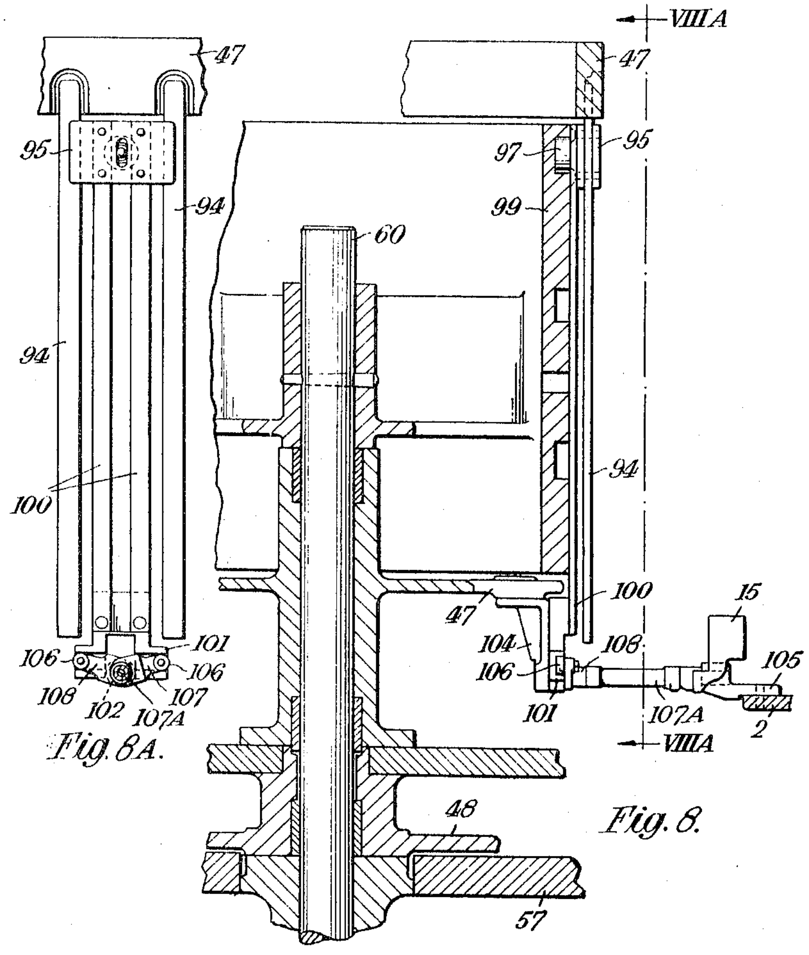
Figure 8B:
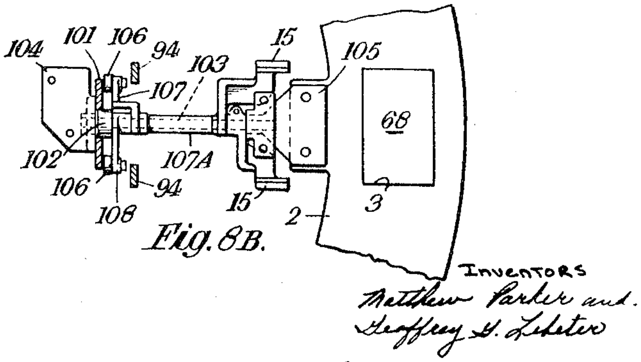
Figures 9, 9B:
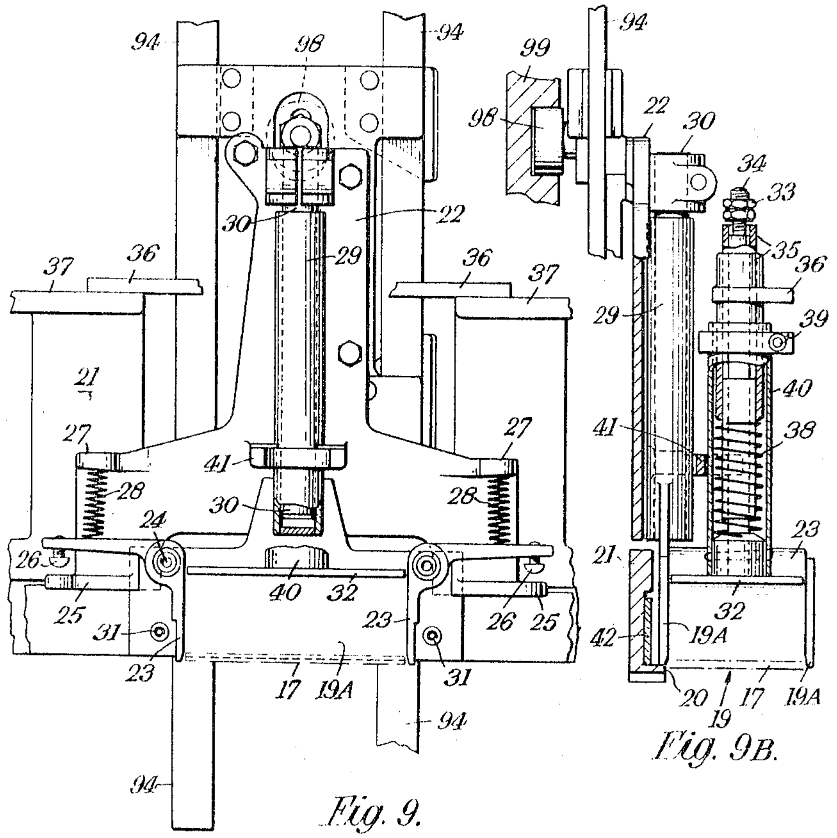
Figure 9A:
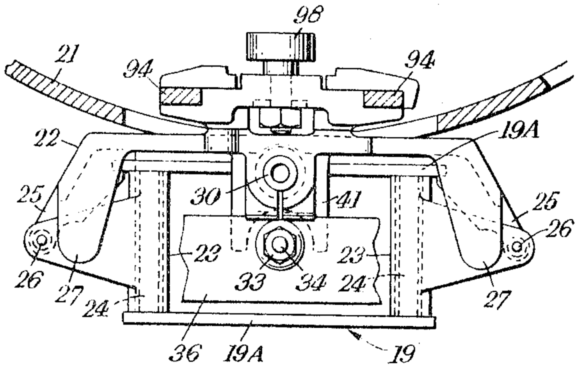
Figure 10:
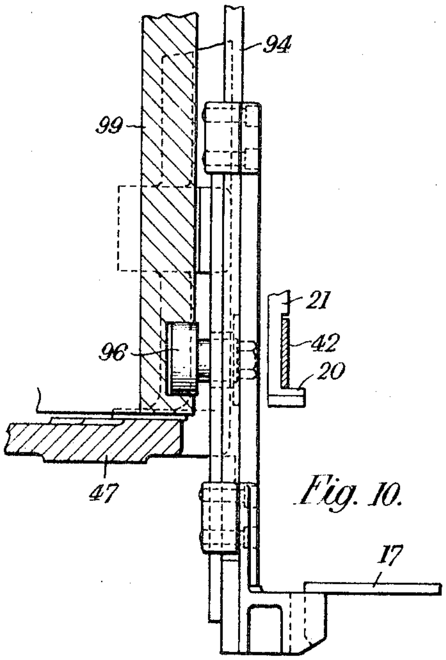
Figure 11B:
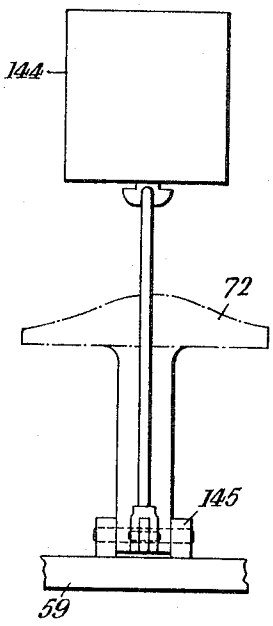
Figure 10A:
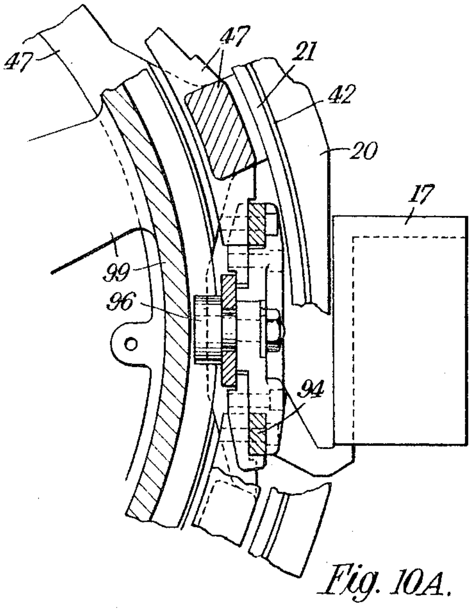
Figure 11C:
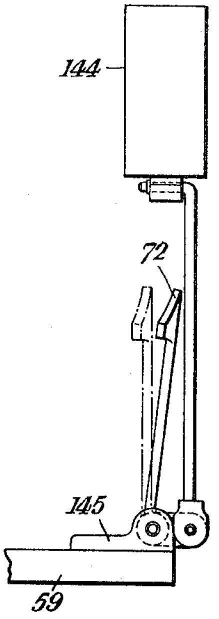
Figure 11:
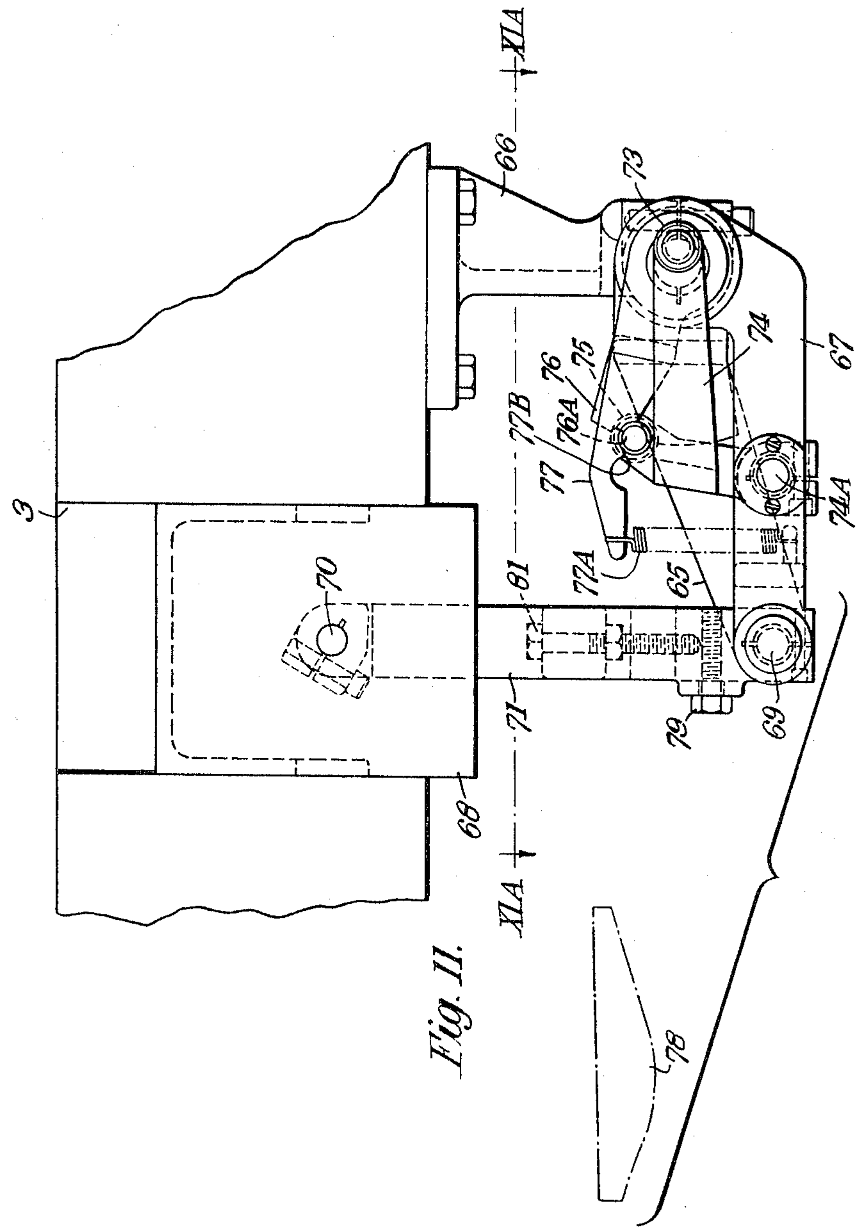
Figure 11A:
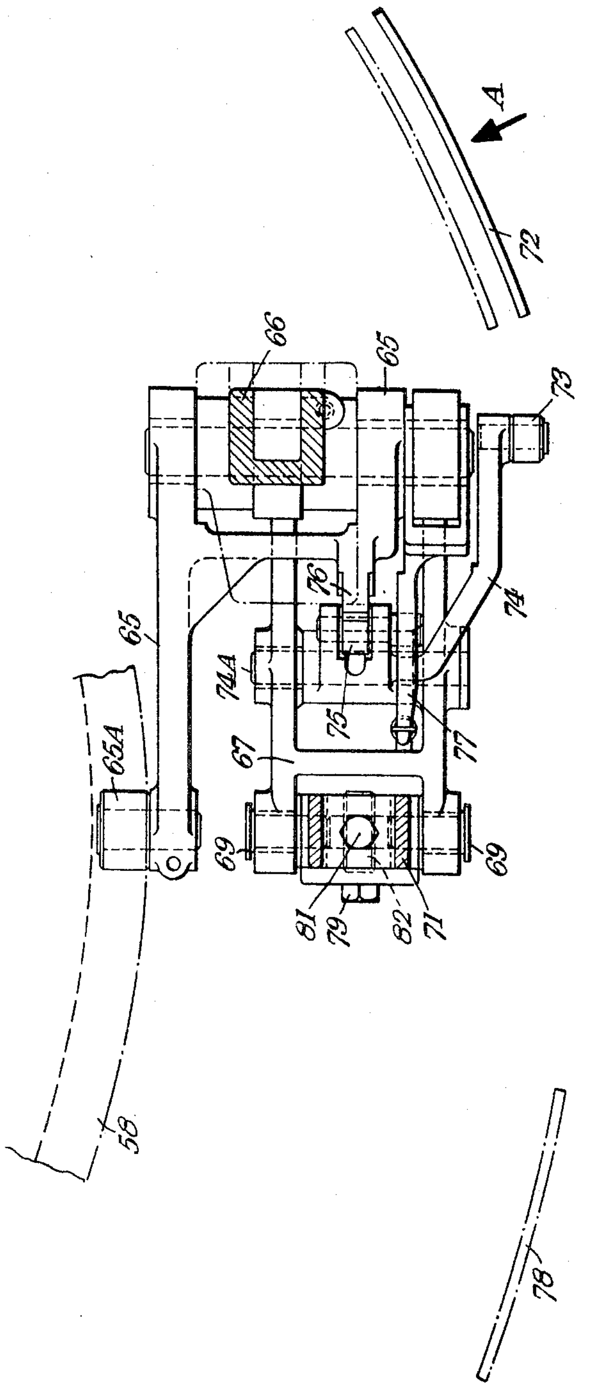
Figure 12:
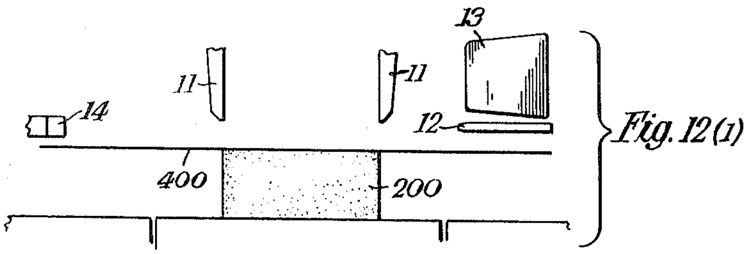
Figure 12:
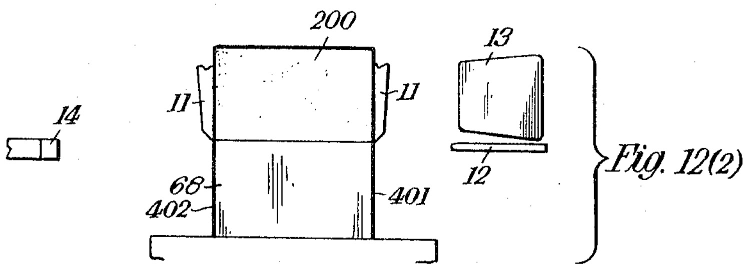
Figure 12:
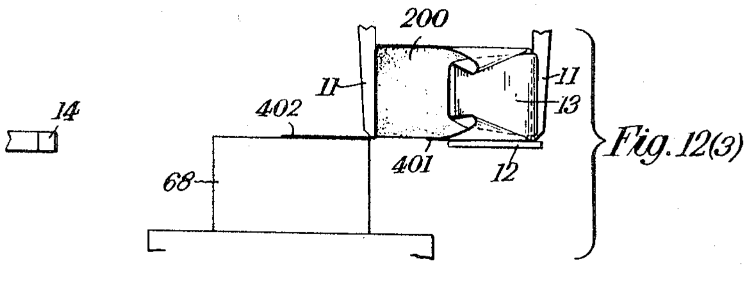
Figure 12:
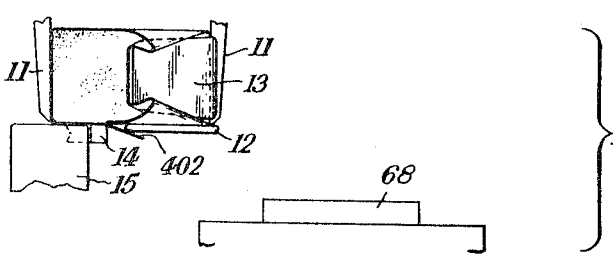
Figure 12:
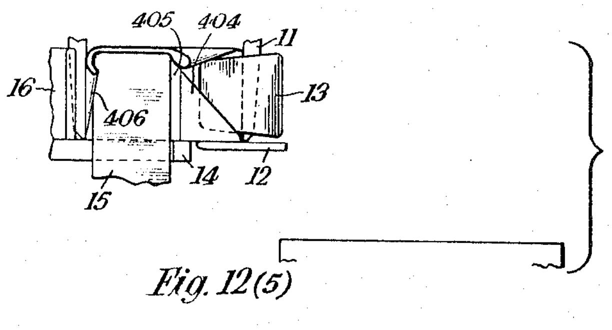
Figure 12:
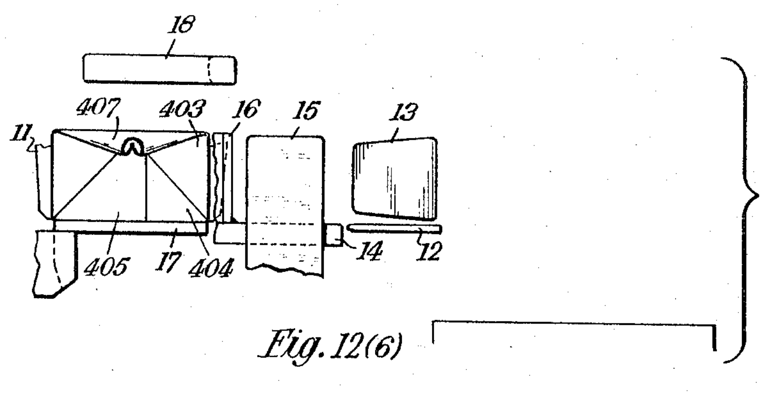
Figure 12:
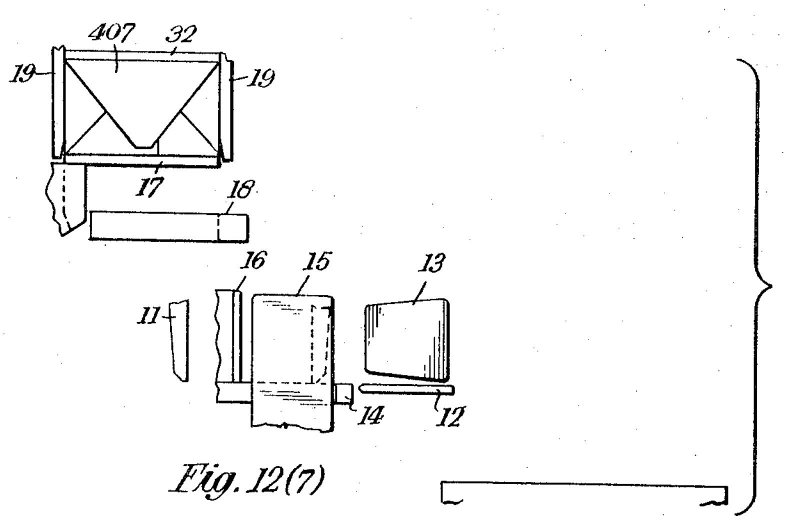
Figure 12:
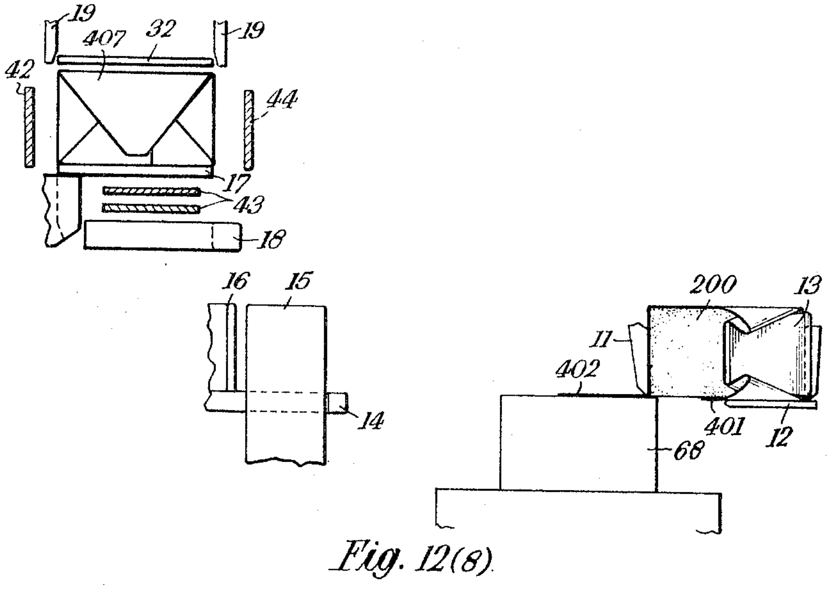
Figure 12:
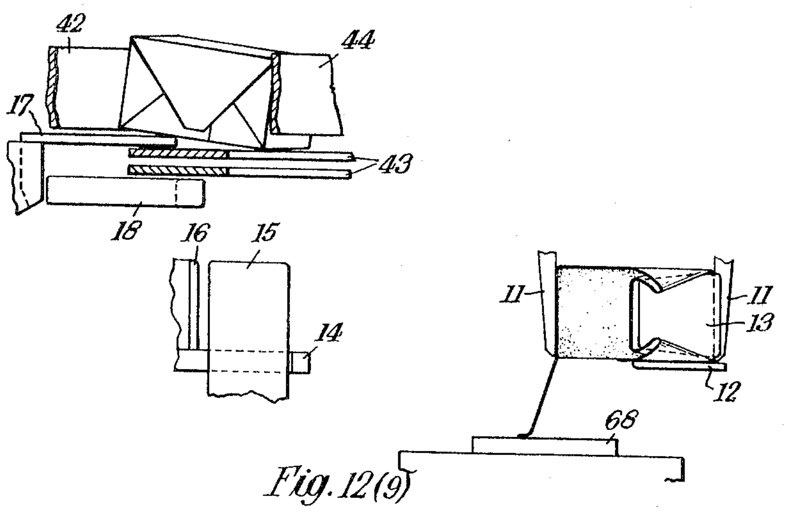

FIG. 2 is a vertical section showing one of the die plungers and wrapping mechanisms, the upper part of the figure being a section on the line II—II and the lower part a section on the line II—IIA in FIG. 1, FIG. 3 is a section on the line III—III in FIG. 2, FIG. 4 is a section on the line IV—IV in FIG. 2, FIG. 5 is a section on the line V—V in FIG. 2, FIG. 5A is a section on the line VA—VA in FIG. 5, FIG. 6 is a plan view showing the weight adjusting mechanism, FIG. 6A is a view looking in the direction of the arrow A in FIG. 6, FIG. 7 is a plan view showing one of the pairs of grippers, FIG. 7A is a corresponding side elevation, FIG. 7B is a section on the line VIIB—VIIB in FIG. 7, FIG. 7C is a scrap view showing delivery of a wrapper to a pair of grippers, FIG. 7D is a view looking in the direction of the arrow A in FIG. 7, FIG. 7E is an end view looking from the right hand side of FIG. 7D, FIG. 8 is a vertical section showing the mechanism for actuating the rotary folders, FIG. 8A is a section on the line VIIIA—VIIIA in FIG. 8, FIG. 8B is a plan view of part of the mechanism shown in FIG. 8, FIG. 9 is an end elevation of the presser box with the front plate removed and other parts broken away, FIG. 9A is a corresponding plan view, FIG. 9B is a corresponding side elevation partly in section, FIG. 10 is a vertical section showing the mechanism for actuating the elevator, FIG. 10A is a corresponding horizontal section, FIG. 11 is a view showing the die plunger cam lever mechanism, FIG. 11A is a section on the line XIA—XIA in FIG. 11, FIG. 11B is a view looking in the direction of the arrow A in FIG. 11A, FIG. 11C is a corresponding side view, and FIGS. 12(1)–12(9) constitute a series of diagrams showing the folding sequence.

As shown in FIG. 1, the machine includes a margarine extrusion box 1, having an extended lower portion 1A which makes good sliding contact with the upper surface of a flat ring 2 in which are formed eight regularly spaced die chambers 3, each of which contains a reciprocating die plunger 68. The upper surface of each die plunger 68 is flush with the upper surface of the ring 2 as it moves into position beneath the extrusion box, and the die plunger begins to descend when the die chamber 3 is fully in communication with the margarine in the extrusion box. The descent of the die plunger terminates slightly before the die chamber has completed its traverse beneath the extrusion box, so that the die chamber is full of margarine when it begins to emerge from beneath the extrusion box.

A toothed ring 2A on the exterior of the ring 2 meshes at 5 with an internal gear 110, centered at the point 6, which carries ten equidistant pairs of grippers each of which, when it reaches the position marked 7, closes to grip a wrapper severed by a continuously rotating rotary knife 9 from a web 8 of wrapping material which is fed to the machine by any suitable known mechanism. The path of feed of the web is downwardly inclined, as shown in FIG. 7C, to allow passage of the grippers beneath it.

When the grippers reach the position 10, where the circular paths of travel of the centres of the die chambers 3 and the centres of the wrappers intersect, they open to release the wrapper, this taking place as a block of margarine 200 is raised by the die plunger 68 from the die chamber 3, into contact with the wrapper. As the die plunger 68 continues to rise, the block 200 is lifted, carrying the wrapper 400 with it, into a pair of carrier jaws 11, this action being shown in FIGS. 12(1) and 12(2). As will be seen the wrapper 400 is folded around the black 200 in inverted U-formation with two depending tails 401, 402. The gear ratio between the toothed ring 2A and the internal gear 110 is 8:10, so that each of the eight die chambers 3 will line up at position 10 with a wrapper carried by one of the ten pairs of grippers at intervals of one machine cycle, i.e. 45° rotation of the ring 2 or 36° rotation of the internal gear 110.

The jaws 11 form part of a wrapping unit 201, of which one only is shown in FIG. 1. It will be understood, however, that eight such wrapping units are provided, each of which is mounted to rotate with the ring 2 adjacent one of the die chambers 3. After the block of margarine has entered the jaws 11, the jaws move in a radially outward direction, as shown in FIG. 12(3) to slide the block off the die plunger 68 and on to a first folder 12 which folds the depending tail 401 of the wrapper against the base of the block. Since the block of margarine is slid off the die plunger in a direction at right angles to the direction of circumferential travel of the die plunger, it is unnecessary to provide for any change in the angular velocity of either the jaws or the die plunger. As the block is moved on to the folder 12, end tuckers 13, fixed to the folder 12, form first end tucks, shown at 403 in FIG. 12(6), in the wrapper. The jaws 11, folder 12 and end tuckers 13 then move in unison in a radially inward direction, as shown in FIG. 12(4) to move the block on to a fixed second folder 14 which folds the other depending tail 402 of the wrapper against the base of the block. During a short dwell in this position, rotary folders 15 move upwardly against the ends of the block, as shown in FIG. 12(5) to fold the projecting parts of the first and second tails 401, 402 against the ends of the block as indicated at 404, 405 in FIG. 12(6). The jaws 11 then move further inwards, as shown in FIG. 12(6), past fixed folders 16 which turn in the two remaining vertical folds, one of which is shown at 406 in FIG. 12(5), to move the block on to an elevator 17. The elevator 17 then rises, as shown in FIG. 12(7), to carry the block through guides 18, which turn down the horizontal pointed tails 407 of the wrapper to complete the wrap, and into a presser box 19.

The presser box 19 is mounted on a reciprocating carrier 22 (FIG. 2) and at the moment of entry of the block into the presser box 19, downward movement of the presser box has just been arrested by contact of its rear wall with a projecting ledge 20 (FIG. 9B) on a pulley 21. The presser box, as shown most clearly in FIGS. 9, 9A and 9B, consist of front and rear walls 19A, joined by pivot pins 24 and stop pins 31, and end plates 23. The end plates 23 are pivoted on the pins 24 and have outwardly extending arms carrying screws 26 and urged downwardly by springs 28 interposed between the arms and lugs 27 on the carrier 22. The box 19 carries a tube 29, fixed to its rear wall, which is slidable on a tube 30 fixed at its upper end to the carrier 22.

While the carrier 22 and box 19 were moving downwardly in unison, prior to entry of the block into the box, lugs 25 on the carrier 22 coacted with the screws 26 to hold the end plates against the stop pins 31. After the block has entered the box 19, the carrier 22 executes a short further downward movement, so removing the lugs 25 from beneath the screws 26 and allowing the springs 28 to move the end walls 23 inwardly to apply pressure to the end folds as shown in FIG. 9. After a short dwell with end pressure applied, the carrier 22 begins to rise and as soon as lugs 25 have, by coaction with the screws 26, rocked the end plates 23 into contact with the stop pins 31, the box 19 is lifted by the carrier 22. The block is prevented from lifting with the box 19 by a top plate 32, the downward movement of which is limited by nuts 33 on a rod 34, which is fixed to the plate 32 and is slidable in a tube 35 fixed to a bar 36 carried on platforms 37 projecting from the pulley 21. A spring 38 confined between the tube 35 and the plate 32 urges the plate 32 downwardly. Towards the end of the upward movement of the carrier 22, a lug 41 on the carrier engages a collar 39, on a tube 40 fixed to the plate 32, to lift the plate 32. The block is now free and its tendency to continue moving in a straight line directs it towards three discharge belts 42, 43, 44 (FIG. 1). The block does not touch any stationary object during its discharge and if it tends to stick to the elevator 17, it is dislodged by the inner belt 42 as the elevator passes beneath this belt. The discharge of the block is shown in FIGS. 12(8) and 12(9).

The belt 42 almost encircles the pulley 21 and the box 19 and plate 32 do not begin to descend again to receive another block until they have passed over the return side of this belt. The elevator 17, after passage over the middle belt 43, lowers slightly to pass under the belt 42, but does not descend to receive the next block until after it is clear of the belt 43. The forward and return runs of the belt 43 are guided by pulleys 45, 46 (FIG. 1A) to run close together so as to reduce the lifting movement of the elevator 17. The belts 42, 44 define the inner and outer walls of the discharge channel.

The mechanisms for imparting the aforesaid movements to the machine parts will now be described.

The main rotating assembly includes a turret 47 (FIG. 2) which rotates on a stationary shaft 60 and carires a disc 48 which supports the ring 2 of die chambers. Surrounding the shaft 60 are fixed cams 99, 57, 58 and a large circular bracket 59 having a central boss which carries the shaft 60. The machine base 61 supports a bearing 62, beneath and offset from the shaft 60, for a rotating frame 63 which carries the internal gear 110 and the grippers and also a toothed ring 64, which is driven from a motor (not shown) through the agency of a pinion 64A at constant speed to impart uniform rotation to the gripper, die and wrapper unit assemblies.

The disc 48 carries eight radial bars 49, each of which extends behind one of the die chambers. On each bar 49 are mounted two slides 50, 51 (FIG. 5). Each slide 50 supports the first folder 12 of one of the wrapping units while the slide 51 carries the corresponding jaws 11. Each bar 49 is flanked, as shown in FIG. 5, by two shorter bars 52 on which slide control members on the slides 50, 51. Studs 53, 54 (FIG. 5A) which are respectively fixed to the slides 50, 51 carry upper runners 55 which engage a guide slot in the disc 48 and lower runners 56, which engage in separate cam tracks in the cam 57. The jaws 11 and first folders 12 are thus given independent radial movements as they rotate about the cam 57.

Reciprocation is imparted to the die plungers 68 by levers 65, pivoted on brackets 66 on the die chamber assembly, and carrying runners 65A (FIGS. 2 and 11A)

which engage a cam track in the cam 68. Normally the lever 65 is connected to a second lever 67 (FIGS. 11 and 11A) by a trip arm 74, pivoted by a pin 74A to the lever 67 and carrying a runner 75 which is in engagement with a recess 76A in a projection 76 on the lever 65. Accordingly the levers 65, 67 move as one to reciprocate the associated die plunger 68 through the agency of a link 71 (see also FIG. 2) pivoted at its opposite ends to the lever 67 and the die plunger 68 by studs 69, 70 respectively. If, however, the grippers fail to pick up a wrapper at position 7 (FIG. 1) a cam piece 72, controlled by a solenoid 144, is moved inwardly as later described from the full line position shown in FIG. 11A into position to intercept a runner 73 on the trip arm 74, as the die chamber approaches position 5 (FIG. 1), so lifting the runner 75 out of the recess 76A and disconnecting the lever 67 from the lever 65. The die plunger 68 is accordingly prevented from rising to discharge the block of margarine at position 5. A detent 77, loaded by a spring 77A (FIG. 11) and pivoted on the same axis as the levers 65, 67, coacts with an eccentric extension of the stud carrying the runner 75 to retain the trip arm 74 in its tripped and untripped position. A fixed cam piece 78 (FIG. 11) on the bracket 59 coacts with the runner 73 to return the arm 74 to the untripped position at a later stage. Only moderate force is required to actuate the trip arm 74 as the ridge 77B separating the two retaining recesses in the detent 77 is small.

A centre piece 80 (FIGS. 2 and 11A) is clamped to the link 71 by a screw 79 and carries a runner 82, which is adjustable by a screw 81 and bears on a circular rail 83 (FIGS. 2 and 6) disposed on the centre line of and below the die chamber assembly. All die chambers must produce identical blocks of margarine and they can be equalized by adjustment of the screws 81. The rail 83 is supported by three screws 84 disposed 120° apart and having bearings in the bracket 59. The screws 84 carry sprockets 85 which are engaged by a chain 86, FIG. 6, which is tightened by a shoe 87 and can be moved by rotating a hand wheel 90 on a shaft 89, journalled in bearings on the bracket 59 and carrying a sprocket 88 engaging the chain. Rotation of the hand wheel 90 thus adjusts the level of the rail 83 and therefore the down stroke permitted to the die plungers 68 and the weight of the moulded blocks of margarine. A projection 91 on the rail 83 supports one end of a section 92 of the lower profile of the track in the cam 58, which is pivoted at its other end 93 to the cam. The section 92 controls the descent of the die plungers during filling of the die chambers and its free end facilitates transference of control of the die plungers to the runner 82 and the rail 83 towards the end of the down stroke by closely following adjustment in level of the rail. Die plungers which have been tripped as described above rest on the rail 83 and unejected blocks move around with their upper surfaces flush with the top surface of the ring 2 until restored wrapper feeding allows the plungers to be reconnected to the levers 65 as described later.

As shown in FIGS. 8 and 8A, the turret 47 carries a number of pairs of vertical slide bars 94, each pair of slide bars being equally spaced about the centre line of one of the eight wrapping units. These slide bars support, in ascending order of level and as shown in FIG. 2, the elevator 17, the carrier 22 of the presser box 19 and a slide 95 for controlling the rotary folders of the wrapping unit. A runner 96 (FIG. 10) carried by the elevator 17 coacts with a bottom track in the cam 99. A runner 98 (FIG. 9B) carried by the carrier 22 coacts with an intermediate track in the cam 99. A runner 97 (FIG. 8) carried by the slide 95 coacts with a top track in the cam 99. Independent vertical movements are thus imparted to the elevator 17, the carrier 22 and the slide 95 as they rotate around the fixed cam 99.

The slide 95 is connected by depending rods 100 (FIG. 8) to a cross head 101 which straddles a runner 102 (FIG. 8A) on a spindle 103 which is rotatable in a bracket 104 fixed to the turret 47 and in a bracket 105 on the ring 2. Slots in the cross head 101 engage runners 106 on levers 107, 108. The lever 107 is connected to the right hand folder 15 by a sleeve 107A embracing the spindle 103. The lever 108 and the left hand folder 15 are attached to the spindle 103. Up and down movement of the cross head 101 thus causes the folders to rotate towards and away from one another.

The pulley 21 (FIGS. 1 and 2) is fixed to the turret 47 and drives the belt 42 and the belts 43, 44 may be driven by any conventional means.

As shown in FIGS. 7 and 7A each gripper unit includes a bracket 109, fixed to the internal gear 110 and carrying a tube 111 to which is fixed a fixed gripper 112 inclined to match the angle af the wrapper feed. Within the tube 111 is a shaft 113 carrying a movable gripper 114, which is controlled by a gear 115 on the shaft 113 which meshes with a toothed quadrant 116 pivoted at 117 to a bracket 118 beneath the internal gear 110. A spring 119, connected between the pivot pin 117 and a pin 121 to the gear 115, retains the movable gripper 114 either in an open position, in which the quadrant 116 bears against a stop 120 or in a closed position. The spring 119 moves over top dead centre as the movable gripper 114 moves from its open to its closed position and vice versa. As the grippers approach position 7 (FIG. 1) a runner 124 on the quadrant 116 engages fixed cam pieces 122 to cause the grippers to close. Later, at position 10 in FIG. 1, the runner 124 engages a similar pair of cam pieces to cause the grippers to open again. The gripper 114 commences to close when its tip is about to pass the leading edge of the web 8 of wrapping material on the inclined plate 125, FIG. 7C, which is slotted to permit of the necessary gripper movement. Preferably the web is travelling at approximately the same speed as the gripper unit as the gripper unit closes to engage the web immediately prior to severance of the wrapper by the knife 9 (FIG. 1).

A thin feeler 126 (FIG. 7A), fixed to a rod 127 which is rotatable in a tube 128, is accommodated in slots in the grippers. The tube 128 is mounted on a bracket 109A carried by the bracket 109, and a lever 129 fixed to the rod 127 carries a knob 130. A spring 131 connected between the knob 130 and a knob 133 on the ring 110 urges the lever 129 towards a stop 132 on the ring 110. A fixed cam piece 134A depresses a runner 134 on the lever 129 to bring the feeler 126 level with the gripping surface of the gripper 112 prior to closure of the gripper 114 and releases the runner 134 after closure of the gripper 114. Provided a wrapper is in position between the grippers, the feeler 126 will be prevented by the wrapper from moving to allow the lever 129 to return to the stop 132 when the runner 134 is released. The stud 135 (FIG. 7D) of the runner 134 will accordingly be held clear of a lever 136.

In the event, however, of failure to grip a wrapper, there will be no impediment to return of the lever 129 to the stop 132 and the stud 135 will trip the lever 136. The lever 136 is pivoted at 137 to the machine framework and normally supports, by a stud 138, a reset lever 139, which is pivoted to the machine frame at 140, in the position shown in FIG. 7D. When the lever 136 is tripped, the reset lever 139 drops to a lower level, at which it is again supported by the stud 138. A spring 141 connecting the stud 138 to a knob 142 on the lever 139 assists in movement of the two levers. When the lever 139 drops, it releases the plunger of a microswitch 143 and this stops the machine and also energizes the solenoid 144 (FIG. 11C) to cause the cam piece 72 to trip the die plungers as already described. The lever 139 is reset manually upon resumption of wrapper feeding.

Failure of the wrapper feed is far more likely to occur as the result of tearing or other malformation of the web of wrapping material than as the result of a single pair of grippers failing properly to pick up a wrapper. It is for this reason that the machine is stopped upon failure of the wrapper feed. It is necessary to trip the die plungers, as described above, when wrapper failure stops the machine because otherwise the machine could not be stopped in time to prevent fouling of the folding mechanisms by unwrapped margarine. Tripping of the die plungers nevertheless enables the machine to be inched, until it is seen that wrappers are being correctly fed but without unwanted blocks of margarine being lifted from the die chambers, which is a useful facility both when the machine is being started at the beginning of a period of production and when it is being restarted following wrapper failure. The main "start" button of the machine remains inoperative and the cam 72 remains in the plunger tripping position until the lever 139 has been reset manually. After this has been done, depression of the "start" button will set the machine in continuous motion.

A machine of the same general construction can be utilized to wrap other articles besides extruded blocks of margarine. In this case the die chambers 3 can be replaced by pockets to receive cartons or other appropriately shaped articles to be wrapped. Also the belts 42, 43, 44 could be replaced by a discharge chute.

What we claim as our invention and desire to secure by Letters Patent is:

1. A wrapping machine, which includes a plurality of wrapping units, each of which is effective completely to wrap an article in a wrapper, means for moving the wrapping units continuously in a predetermined path in relation to an assembly of fixed cams which impart operating movement to the wrapping units, an article feeding mechanism arranged to present articles in succession to the wrapping units as they reach a predetermined point in their path of travel, and a wrapper feed mechanism for presenting wrappers to the wrapping units at the same predetermined point, the wrapping units delivering the wrapped articles at a common discharge point.

2. A machine for wrapping margarine, butter and like plastic substances, which includes a plurality of die chambers, a wrapping unit associated with each die chamber, each wrapping unit being effective completely to wrap an article in a wrapper, means for moving the die chambers and the wrapping units continuously in a predetermined path around an assembly of fixed cams, means controlled by the fixed cams for actuating the wrapping units and also die plungers in the die chambers, the die chambers moving in succession past an extrusion box which fills them in succession with margarine and the die plungers operating in succession to discharge blocks of margarine to the wrapping units, means for presenting wrappers in succession to the wrapping units as the blocks of margarine are fed into them from the die chambers, and a single discharge mechanism for the discharge of the wrapped blocks of margarine.

3. A machine as claimed in claim 2, which includes a continuously travelling gripper assembly arranged to pick up wrappers in succession and traverse them in a path intersecting the path of travel of the die chambers, the wrappers being transferred in succession to the wrapping units at the point of intersection of the two paths.

4. A machine as claimed in claim 3, in which the die chambers and wrapping units travel in an inner circular path and the gripper assembly includes a plurality of pairs of grippers which travel in an outer circular path of larger radius which touches the inner path.

5. A machine as claimed in claim 4, in which each wrapping unit includes jaws which are arranged to receive the blocks of margarine and to move radially in relation to the die plungers to cause the blocks of margarine to slide off the die plungers, and in which the die plungers and jaws rotate around the fixed cams at the same constant angular velocity.

6. A machine as claimed in claim 5, in which each wrapping unit includes folders arranged to cooperate with the block of margarine to fold the wrapper around it upon radial movement of the jaws in relation to said folders.

7. A machine as claimed in claim 2, in which the die chambers travel in a horizontal path and the wrapped blocks of margarine are discharged from the wrapping units by a system of belts including a belt which dislodges the blocks from an elevator in the wrapping unit in case it should tend to stick.

8. A machine as claimed in claim 4, in which each wrapping unit includes a pair of jaws for receiving a block of margarine from a die plunger, means for imparting radial movement to the jaws to remove the block from the die plunger, folders operative in response to radial movement of the jaws for partially completing the wrap, rotary folders for further completing the wrap, an elevator to which the block is transferred by radial movement of the jaws, and further folders which finally complete the wrap upon upward movement of the elevator.

9. A machine as claimed in claim 8, which includes a presser box for applying pressure to the wrapped block while carried on the elevator.

10. A machine as claimed in claim 3, in which the gripper assembly includes a trip mechanism which is effective, in response to failure of wrapper feed to the gripper assembly, to prevent actuation of the die plungers.

11. A machine as claimed in claim 10, in which operation of the trip mechanism is effective to stop the machine.

No references cited.

RICHARD H. EANES, Jr., *Primary Examiner.*